(12) United States Patent
Sutherland (10) Patent No.: US 10,715,563 B1
(45) Date of Patent: Jul. 14, 2020

(54) METHOD AND APPARATUS FOR SESSION SHARING SHARED WORKER MODULE

(71) Applicant: JPMorgan Chase Bank, N.A., New York, NY (US)

(72) Inventor: Kenneth A. Sutherland, Broxburn (GB)

(73) Assignee: JPMORGAN CHASE BANK, N.A., New York, NY (US)

( * ) Notice: Subject to any disclaimer, the term of this patent is extended or adjusted under 35 U.S.C. 154(b) by 0 days.

(21) Appl. No.: 16/244,683

(22) Filed: Jan. 10, 2019

(51) Int. Cl.
*H04L 29/06* (2006.01)
*H04L 12/24* (2006.01)
*H04L 29/08* (2006.01)

(52) U.S. Cl.
CPC ...... *H04L 65/1069* (2013.01); *H04L 41/0253* (2013.01); *H04L 65/1083* (2013.01); *H04L 67/02* (2013.01)

(58) Field of Classification Search
CPC ............ H04L 65/1069; H04L 65/1083; H04L 41/0253; H04L 67/02; H04L 41/025
USPC ........................................................ 709/219
See application file for complete search history.

(56) References Cited

U.S. PATENT DOCUMENTS

| 9,232,011 B2* | 1/2016 | Galushka | H04L 67/22 |
| 2007/0180381 A1* | 8/2007 | Rice | G06F 16/9577 715/711 |
| 2010/0031153 A1* | 2/2010 | Ortwein | G06F 9/542 715/733 |

* cited by examiner

*Primary Examiner* — Zi Ye
(74) *Attorney, Agent, or Firm* — Greenblum & Bernstein, P.L.C.

(57) ABSTRACT

Various methods, apparatuses, and media for implementing a session sharing shared worker module are provided. A processor executes a first web application and a second web application within a web browser. The first web application is associated with a first tab and the second web application is associated with a second tab having different web content than the first tab. The processor determines whether a shared worker is available within the web browser. A session sharing module is configured to: register each of the first tab and the second tab with the shared worker based on determining that the shared worker is available within the web browser; receive a first request from the first tab to connect to a server and a second request from the second tab to connect to the server; combine the first request and the second request into one packaged request; and send the one packaged request to the server via one connection point.

9 Claims, 5 Drawing Sheets

METHOD AND APPARATUS FOR SESSION SHARING SHARED WORKER MODULE

TECHNICAL FIELD

This disclosure generally relates to network communications, and, more particularly, to methods and apparatuses for implementing a session sharing shared worker application to improve network communications between a client device and a server device.

BACKGROUND

In the current technological environment, a computing device (e.g., a personal computer (PC), tablet PC, laptop, personal digital assistant (PDA), cellphone, smartphone, or the like) may be configured to implement a web browser which is an application (computer executable program) that operates on the computing device to enable information available over a network (e.g., the Internet) to be accessed. A web browser may be configured to access information available over a network by utilizing uniform resource identifiers (URIs), which indicate a location by which information may be accessed over the network. A typical web browser may be configured to present network-accessible and/or other information to a user in one or more browser windows, or browser tabs within the browser. A web browser may enable a user to open a plurality of web-browser windows, or tabs within the web browser of a computing device, simultaneously.

A web application is a software application that is accessible via a web browser as discussed above. For example, a web application may be a document, such as a hypertext markup language (HTML) document. A document web application may be configured to present information available over a network visually to a user. A document web application may present to a user of a client device (e.g., a computing device as discussed above operating at client side) one or more links (e.g., to a URI) to available information.

Typically, when using a web browser application to connect to a back-end infrastructure (e.g., a server), sessions (which may include browsing related processes) may not be shared as data between multiple tabs within a browser may not be shared easily. Also, in a typical browser implementation, using cookies may not be a suitable means for data sharing between multiple tabs and opening a local port may not be available, thereby resulting in a poor system performance and communication delay. For example, if twenty (20) tabs are open within a web browser window of a computing device, and because opening of a local port may not be available for data sharing between multiple tabs in a typical browser implementation, twenty (20) individual connection ports, one for each tab, may be created to connect to a server, causing a slower network communication and an increased power consumption, and/or any other issue that may cause poor system performance. Poor system performance may include, for example, delayed server responses, slow webpage load times, network congestion, system latency, slow client device response times, etc.

SUMMARY

The present disclosure, through one or more of its various aspects, embodiments, and/or specific features or sub-components, provides, inter alia, various systems, servers, devices, methods, media, programs, and platforms for implementing a session sharing shared worker application to improve network communications between a client device and a server device. The various aspects, embodiments, features, and/or sub-components provide optimized processes of implementing a session sharing shared worker application in which a single connection port is created within a shared worker space for a plurality of tabs to improve network communications between a client device and a server.

According to an aspect of the present disclosure, a method for implementing a session sharing shared worker module is disclosed. The method may include: executing, by a processor, a first web application and a second web application within a web browser, the first web application being associated with a first tab, the second web application being associated with a second tab having different web content than the first tab; determining, by the processor, whether a shared worker is available within the web browser; registering, by a session sharing module, each of said first tab and the second tab with the shared worker based on determining that the shared worker is available within the web browser; receiving, by the session sharing module, a first request from the first tab to connect to a server and a second request from the second tab to connect to the server; combining, by the session sharing module, the first request and the second request into one packaged request; and sending, by the session sharing module, the one packaged request to the server via one connection point.

The method may further include: storing, in response to registering, within the shared worker a first reference identification associated with the first tab and a second reference identification associated with the second tab; receiving, by the session sharing module, a first response corresponding to the first request and a second response corresponding to the second request from the server as a packaged response via the one connection point; and routing the first response to the first tab via a first path based on the first reference identification and the second response to the second tab via a second path different from the first path based on the second reference identification.

The shared worker may be an area of the web browser that may be operating at a higher level than the first and second tabs and may be configured to run programming in the same manner as the first and second tabs but without any visuals.

The shared worker may be accessible from all tabs within the browser and may be configured to allow one tab to communicate to other tabs via the higher level.

When a plurality of tabs are opened by the processor at the same time or before a connection is established between the session sharing module and the server, the method may further include: maintaining the one connection point open so that the session sharing module can receive a message corresponding to each of said plurality of tabs via the one connection point.

When a plurality of tabs are opened by the processor at the same time and a connection is established between the session sharing module and the server via the one connection point, and then one of the plurality of tabs is closed by the processor before receiving a message from the server, the method may further include: maintaining the one connection point open so that the session sharing module can receive a message corresponding to each of said plurality of tabs via the one connection; and closing a connection between the session sharing module and the closed tab.

According to another aspect of the present disclosure, a system for implementing a session sharing shared worker module is disclosed. The system may include a processor; a session sharing module including a registration module, a package creation module, a memory access module and a communication module; and a server. The processor may be configured to execute a first web application and a second web application within a web browser, the first web application being associated with a first tab, the second web application being associated with a second tab having different web content than the first tab and determine whether a shared worker is available within the web browser. The registration module may be configured to register each of said first tab and the second tab with the shared worker based on determining that the shared worker is available within the web browser. The communication module may be configured to receive a first request from the first tab to connect to the server and a second request from the second tab to connect to the server. The package creation module may be configured to combine the first request and the second request into one packaged request, and the communication module may be configured to send the one packaged request to the server via one connection point.

The memory access module may be configured to store within the shared worker a first reference identification associated with the first tab and a second reference identification associated with the second tab.

The communication module may be configured to receive a first response corresponding to the first request and a second response corresponding to the second request from the server as a packaged response via the one connection point, and route the first response to the first tab via a first path based on the first reference identification and the second response to the second tab via a second path different from the first path based on the second reference identification.

The communication module may be configured to receive a first response corresponding to the first request and a second response corresponding to the second request from the server as a packaged response via the one connection point and route the first response to the first tab via a first path and the second response to the second tab via a second path different from the first path.

When a plurality of tabs are opened by the processor at the same time or before a connection is established between the session sharing module and the server, the communication module may be configured to maintain the one connection point open so that the communication module can receive a message corresponding to each of said plurality of tabs via the one connection point.

When a plurality of tabs are opened by the processor at the same time and a connection is established between the session sharing module and the server via the one connection point, and then one of the plurality of tabs is closed by the processor before receiving a message from the server, the communication module may be configured to: maintain the one connection point open so that the session sharing module can receive a message corresponding to each of said plurality of tabs via the one connection; and close a connection between the session sharing module and the closed tab.

According to yet another aspect of the present disclosure, a non-transitory computer readable medium configured to store instructions for implementing a session sharing shared worker is disclosed. When executed, the instructions may cause a computer to perform the following: executing a first web application and a second web application within a web browser, the first web application being associated with a first tab, the second web application being associated with a second tab having different web content than the first tab; determining whether a shared worker is available within the web browser; registering each of said first tab and the second tab with the shared worker based on determining that the shared worker is available within the web browser; receiving a first request from the first tab to connect to a server and a second request from the second tab to connect to the server; combining the first request and the second request into one packaged request; and sending the one packaged request to the server via one connection point.

The instructions may further cause the computer to perform the following: storing within the shared worker a first reference identification associated with the first tab and a second reference identification associated with the second tab; receiving a first response corresponding to the first request and a second response corresponding to the second request from the server as a packaged response via the one connection point; and routing the first response to the first tab via a first path based on the first reference identification and the second response to the second tab via a second path different from the first path based on the second reference identification.

The instructions may further cause the computer to perform the following: receiving a first response corresponding to the first request and a second response corresponding to the second request from the server as a packaged response via the one connection point; and routing the first response to the first tab via a first path and the second response to the second tab via a second path different from the first path.

When a plurality of tabs are opened by a processor at the same time or before a connection is established between a session sharing module and the server, the instructions may further cause the computer to maintain the one connection point open so that the session sharing module can receive a message corresponding to each of said plurality of tabs via the one connection point.

When a plurality of tabs are opened by a processor at the same time and a connection is established between the session sharing module and the server via the one connection point, and then one of the plurality of tabs is closed by the processor before receiving a message from the server, the instructions may further cause the computer to perform the following steps: maintaining the one connection point open so that the session sharing module can receive a message corresponding to each of said plurality of tabs via the one connection; and closing a connection between the session sharing module and the closed tab.

BRIEF DESCRIPTION OF THE DRAWINGS

The present disclosure is further described in the detailed description which follows, in reference to the noted plurality of drawings, by way of non-limiting examples of preferred embodiments of the present disclosure, in which like characters represent like elements throughout the several views of the drawings.

DETAILED DESCRIPTION

Through one or more of its various aspects, embodiments and/or specific features or sub-components of the present disclosure, are intended to bring out one or more of the advantages as specifically described above and noted below.

The examples may also be embodied as one or more non-transitory computer readable media having instructions stored thereon for one or more aspects of the present technology as described and illustrated by way of the examples herein. The instructions in some examples include executable code that, when executed by one or more processors, cause the processors to carry out steps necessary to implement the methods of the examples of this technology that are described and illustrated herein.

As is traditional in the field of the present disclosure, example embodiments are described, and illustrated in the drawings, in terms of functional blocks, units and/or modules. Those skilled in the art will appreciate that these blocks, units and/or modules are physically implemented by electronic (or optical) circuits such as logic circuits, discrete components, microprocessors, hard-wired circuits, memory elements, wiring connections, and the like, which may be formed using semiconductor-based fabrication techniques or other manufacturing technologies. In the case of the blocks, units and/or modules being implemented by microprocessors or similar, they may be programmed using software (e.g., microcode) to perform various functions discussed herein and may optionally be driven by firmware and/or software. Alternatively, each block, unit and/or module may be implemented by dedicated hardware, or as a combination of dedicated hardware to perform some functions and a processor (e.g., one or more programmed microprocessors and associated circuitry) to perform other functions. Also, each block, unit and/or module of the example embodiments may be physically separated into two or more interacting and discrete blocks, units and/or modules without departing from the scope of the inventive concepts. Further, the blocks, units and/or modules of the example embodiments may be physically combined into more complex blocks, units and/or modules without departing from the scope of the present disclosure.

Figure 1:
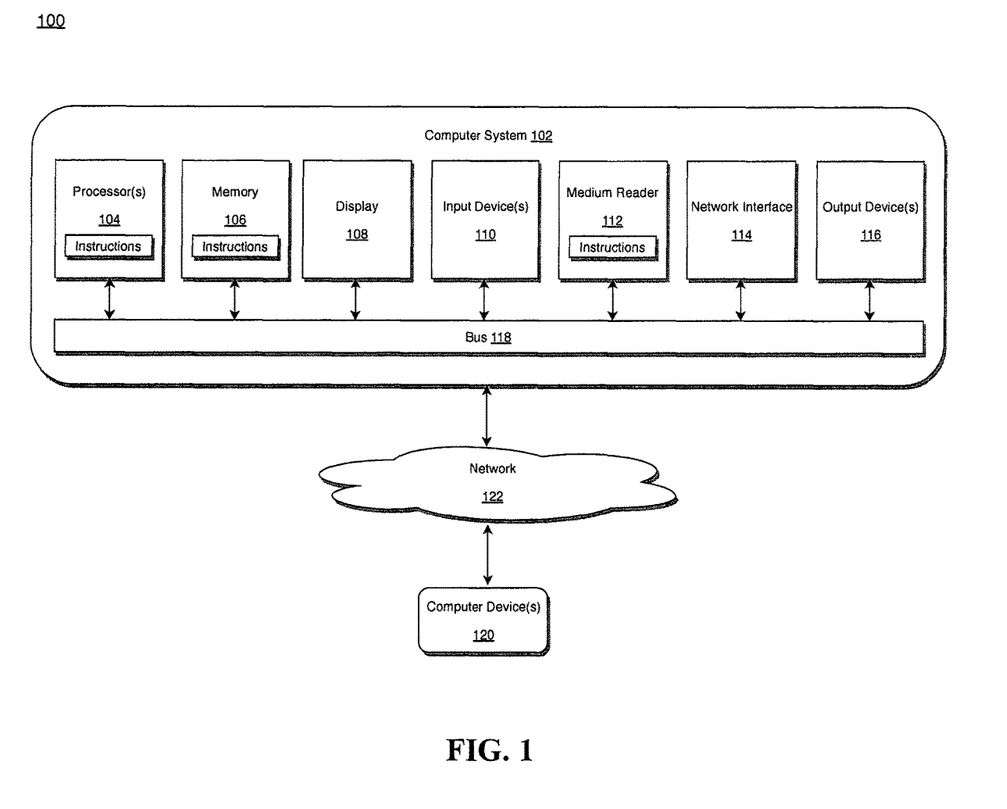
FIG. 1 illustrates a computer system for implementing a session sharing shared worker module in accordance with an exemplary embodiment.

FIG. 1 is an exemplary system for use in accordance with the embodiments described herein. The system 100 is generally shown and may include a computer system 102, which is generally indicated.

The computer system 102 may include a set of instructions that can be executed to cause the computer system 102 to perform any one or more of the methods or computer based functions disclosed herein, either alone or in combination with the other described devices. The computer system 102 may operate as a standalone device or may be connected to other systems or peripheral devices. For example, the computer system 102 may include, or be included within, any one or more computers, servers, systems, communication networks or cloud environment. Even further, the instructions may be operative in such cloud-based computing environment.

In a networked deployment, the computer system 102 may operate in the capacity of a server or as a client user computer in a server-client user network environment, a client user computer in a cloud computing environment, or as a peer computer system in a peer-to-peer (or distributed) network environment. The computer system 102, or portions thereof, may be implemented as, or incorporated into, various devices, such as a personal computer, a tablet computer, a set-top box, a personal digital assistant, a mobile device, a palmtop computer, a laptop computer, a desktop computer, a communications device, a wireless smart phone, a personal trusted device, a wearable device, a global positioning satellite (GPS) device, a web appliance, or any other machine capable of executing a set of instructions (sequential or otherwise) that specify actions to be taken by that machine. Further, while a single computer system 102 is illustrated, additional embodiments may include any collection of systems or sub-systems that individually or jointly execute instructions or perform functions. The term system shall be taken throughout the present disclosure to include any collection of systems or sub-systems that individually or jointly execute a set, or multiple sets, of instructions to perform one or more computer functions.

As illustrated in FIG. 1, the computer system 102 may include at least one processor 104. The processor 104 is tangible and non-transitory. As used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The processor 104 is an article of manufacture and/or a machine component. The processor 104 is configured to execute software instructions in order to perform functions as described in the various embodiments herein. The processor 104 may be a general purpose processor or may be part of an application specific integrated circuit (ASIC). The processor 104 may also be a microprocessor, a microcomputer, a processor chip, a controller, a microcontroller, a digital signal processor (DSP), a state machine, or a programmable logic device. The processor 104 may also be a logical circuit, including a programmable gate array (PGA) such as a field programmable gate array (FPGA), or another type of circuit that includes discrete gate and/or transistor logic. The processor 104 may be a central processing unit (CPU), a graphics processing unit (GPU), or both. Additionally, any processor described herein may include multiple processors, parallel processors, or both. Multiple processors may be included in, or coupled to, a single device or multiple devices.

The computer system 102 may also include a computer memory 106. The computer memory 106 may include a static memory, a dynamic memory, or both in communication. Memories described herein are tangible storage mediums that can store data and executable instructions, and are non-transitory during the time instructions are stored therein. Again, as used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The memories are an article of manufacture and/or machine component. Memories described herein are computer-readable mediums from which data and executable instructions can be read by a computer. Memories as described herein may be random access memory (RAM), read only memory (ROM), flash memory, electrically programmable read only memory (EPROM), electrically erasable programmable read-only memory (EEPROM), registers, a hard disk, a cache, a removable disk, tape, compact disk read only memory (CD-ROM), digital versatile disk (DVD), floppy disk, blu-ray disk, or any other form of storage medium known in the art. Memories may be volatile or non-volatile, secure and/or encrypted, unsecure and/or unencrypted. Of course, the computer memory 106 may comprise any combination of memories or a single storage.

The computer system 102 may further include a video display 108, such as a liquid crystal display (LCD), an organic light emitting diode (OLED), a flat panel display, a solid state display, a cathode ray tube (CRT), a plasma display, or any other known display.

The computer system 102 may also include at least one input device 110, such as a keyboard, a touch-sensitive input screen or pad, a speech input, a mouse, a remote control device having a wireless keypad, a microphone coupled to a speech recognition engine, a camera such as a video camera or still camera, a cursor control device, a global positioning system (GPS) device, an altimeter, a gyroscope, an accelerometer, a proximity sensor, or any combination thereof. Those skilled in the art appreciate that various embodiments of the computer system 102 may include multiple input devices 110. Moreover, those skilled in the art further appreciate that the above-listed, exemplary input devices 110 are not meant to be exhaustive and that the computer system 102 may include any additional, or alternative, input devices 110.

The computer system 102 may also include a medium reader 112 which is configured to read any one or more sets of instructions, e.g., software, from any of the memories described herein. The instructions, when executed by a processor, can be used to perform one or more of the methods and processes as described herein. In a particular embodiment, the instructions may reside completely, or at least partially, within the memory 106, the medium reader 112, and/or the processor 110 during execution by the computer system 102.

Furthermore, the computer system 102 may include any additional devices, components, parts, peripherals, hardware, software or any combination thereof which are commonly known and understood as being included with or within a computer system, such as, but not limited to, a network interface 114 and an output device 116. The output device 116 may be, but is not limited to, a speaker, an audio out, a video out, a remote control output, a printer, or any combination thereof.

Each of the components of the computer system 102 may be interconnected and communicate via a bus 118 or other communication link. As shown in FIG. 1, the components may each be interconnected and communicate via an internal bus. However, those skilled in the art appreciate that any of the components may also be connected via an expansion bus. Moreover, the bus 118 may enable communication via any standard or other specification commonly known and understood such as, but not limited to, peripheral component interconnect, peripheral component interconnect express, parallel advanced technology attachment, serial advanced technology attachment, etc.

The computer system 102 may be in communication with one or more additional computer devices 120 via a network 122. The network 122 may be, but is not limited to, a local area network, a wide area network, the Internet, a telephony network, a short-range network, or any other network commonly known and understood in the art. The short-range network may include, for example, Bluetooth, Zigbee, infrared, near field communication, ultraband, or any combination thereof. Those skilled in the art appreciate that additional networks 122 which are known and understood may additionally or alternatively be used and that the exemplary networks 122 are not limiting or exhaustive. Also, while the network 122 is shown in FIG. 1 as a wireless network, those skilled in the art appreciate that the network 122 may also be a wired network.

The additional computer device 120 is shown in FIG. 1 as a personal computer. However, those skilled in the art appreciate that, in alternative embodiments of the present application, the computer device 120 may be a laptop computer, a tablet PC, a personal digital assistant, a mobile device, a palmtop computer, a desktop computer, a communications device, a wireless telephone, a personal trusted device, a web appliance, a server, or any other device that is capable of executing a set of instructions, sequential or otherwise, that specify actions to be taken by that device. Of course, those skilled in the art appreciate that the above-listed devices are merely exemplary devices and that the device 120 may be any additional device or apparatus commonly known and understood in the art without departing from the scope of the present application. For example, the computer device 120 may be the same or similar to the computer system 102. Furthermore, those skilled in the art similarly understand that the device may be any combination of devices and apparatuses.

Of course, those skilled in the art appreciate that the above-listed components of the computer system 102 are merely meant to be exemplary and are not intended to be exhaustive and/or inclusive. Furthermore, the examples of the components listed above are also meant to be exemplary and similarly are not meant to be exhaustive and/or inclusive.

In accordance with various embodiments of the present disclosure, the methods described herein may be implemented using a hardware computer system that executes software programs. Further, in an exemplary, non-limited embodiment, implementations can include distributed processing, component/object distributed processing, and parallel processing. Virtual computer system processing can be constructed to implement one or more of the methods or functionality as described herein, and a processor described herein may be used to support a virtual processing environment.

As described herein, various embodiments provide optimized processes of implementing a session sharing shared worker application to improve network communication between a client device and a server device.

Figure 2:
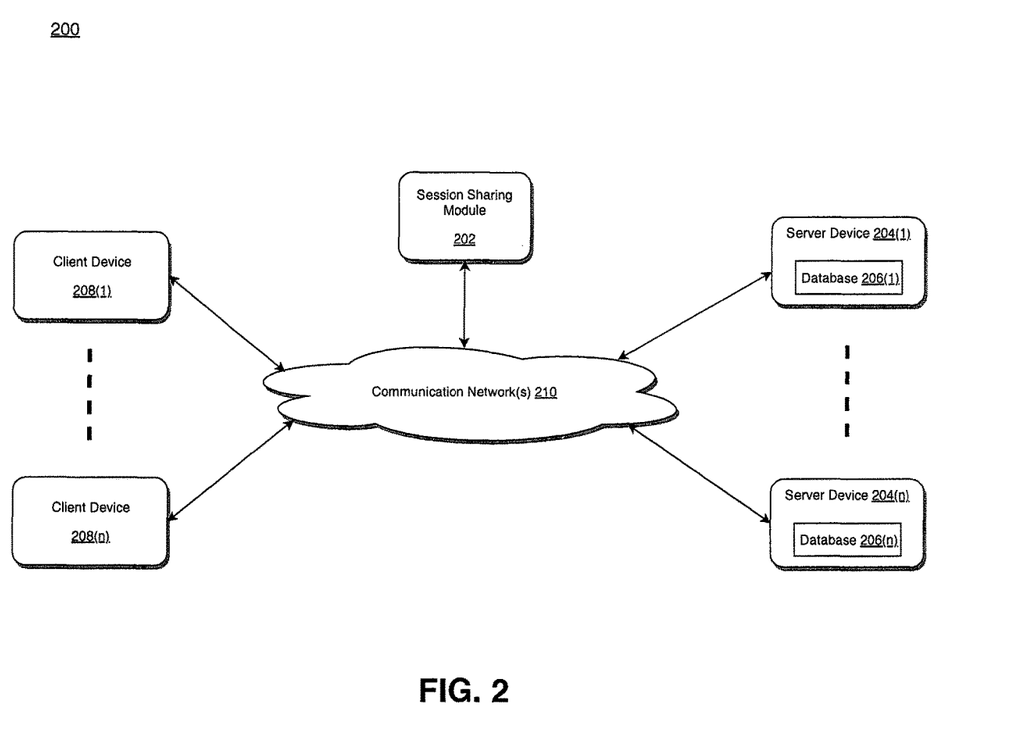
FIG. 2 illustrates an exemplary diagram of a network environment with a session sharing shared worker module in accordance with an exemplary embodiment.

Referring to FIG. 2, a schematic of an exemplary network environment 200 for implementing a session sharing shared worker application of the instant disclosure is illustrated. In a typical browser implementation, when a plurality of web browser windows or tabs are open within a web browser of a computing device, each browser window or tab may be individually connected to a server via a dedicated connection port. For example, if twenty (20) tabs are open within a web browser window of a computing device, according to a typical browser implementation, twenty (20) individual connection ports, one for each tab, may be created to connect to a server, causing a slower network communication and an increased power consumption, and/or any other issue that may cause poor system performance. Poor system performance may include, for example, delayed server responses, slow webpage load times, network congestion, system latency, slow client device response times, etc.

According to exemplary embodiments, the system performance and reduction of power consumption may be facilitated by implementing a session sharing module (SSM) 202 as illustrated in FIG. 2. The SSM 202 may be the same or similar to the computer system 102 as described with respect to FIG. 1. The SSM 202 may store one or more applications that can include executable instructions that, when executed by the SSM 202, cause the SSM 202 to perform actions, such as to transmit, receive, or otherwise process network messages, for example, and to perform other actions described and illustrated below with reference to the figures. The application(s) may be implemented as modules or components of other applications. Further, the application(s) can be implemented as operating system extensions, modules, plugins, or the like.

Even further, the application(s) may be operative in a cloud-based computing environment. The application(s) may be executed within or as virtual machine(s) or virtual server(s) that may be managed in a cloud-based computing environment. Also, the application(s), and even the SSM 202 itself, may be located in virtual server(s) running in a cloud-based computing environment rather than being tied to one or more specific physical network computing devices. Also, the application(s) may be running in one or more virtual machines (VMs) executing on the SSM 202. Additionally, in one or more embodiments of this technology, virtual machine(s) running on the SSM 202 may be managed or supervised by a hypervisor.

In the network environment 200 of FIG. 2, the SSM 202 is coupled to a plurality of server devices 204(1)-204(n) that hosts a plurality of databases 206(1)-206(n), and also to a plurality of client devices 208(1)-208(n) via communication network(s) 210. A communication interface of the SSM 202, such as the network interface 114 of the computer system 102 of FIG. 1, operatively couples and communicates between the SSM 202, the server devices 204(1)-204(n), and/or the client devices 208(1)-208(n), which are all coupled together by the communication network(s) 210, although other types and/or numbers of communication networks or systems with other types and/or numbers of connections and/or configurations to other devices and/or elements may also be used.

The communication network(s) 210 may be the same or similar to the network 122 as described with respect to FIG. 1, although the SSM 202, the server devices 204(1)-204(n), and/or the client devices 208(1)-208(n) may be coupled together via other topologies. Additionally, the network environment 200 may include other network devices such as one or more routers or switches, for example, which are well known in the art and thus will not be described herein. This technology provides a number of advantages including methods, non-transitory computer readable media, and SSMs that efficiently combine multiple client side to server connections from the same browser into a single connection per browser to improve network communication and reduce power consumption.

By way of example only, the communication network(s) 210 may include local area network(s) (LAN(s)) or wide area network(s) (WAN(s)), and can use TCP/IP over Ethernet and industry-standard protocols, although other types and/or numbers of protocols and/or communication networks may be used. The communication network(s) 202 in this example may employ any suitable interface mechanisms and network communication technologies including, for example, teletraffic in any suitable form (e.g., voice, modem, and the like), Public Switched Telephone Network (PSTNs), Ethernet-based Packet Data Networks (PDNs), combinations thereof, and the like.

The SSM 202 may be a standalone device or integrated with one or more other devices or apparatuses, such as one or more of the server devices 204(1)-204(n), for example. In one particular example, the SSM 202 may include or be hosted by one of the server devices 204(1)-204(n), and other arrangements are also possible. Moreover, one or more of the devices of the SSM 202 may be in a same or a different communication network including one or more public, private, or cloud networks, for example.

The plurality of server devices 204(1)-204(n) may be the same or similar to the computer system 102 or the computer device 120 as described with respect to FIG. 1, including any features or combination of features described with respect thereto. For example, any of the server devices 204(1)-204(n) may include, among other features, one or more processors, a memory, and a communication interface, which are coupled together by a bus or other communication link, although other numbers and/or types of network devices may be used. The server devices 204(1)-204(n) in this example may process requests received from the SSM 202 via the communication network(s) 210 according to the HTTP-based and/or JavaScript Object Notation (JSON) protocol, for example, although other protocols may also be used.

The server devices 204(1)-204(n) may be hardware or software or may represent a system with multiple servers in a pool, which may include internal or external networks. The server devices 204(1)-204(n) hosts the databases 206(1)-206(n) that are configured to store metadata sets, data quality rules, and newly generated data.

Although the server devices 204(1)-204(n) are illustrated as single devices, one or more actions of each of the server devices 204(1)-204(n) may be distributed across one or more distinct network computing devices that together comprise one or more of the server devices 204(1)-204(n). Moreover, the server devices 204(1)-204(n) are not limited to a particular configuration. Thus, the server devices 204(1)-204(n) may contain a plurality of network computing devices that operate using a master/slave approach, whereby one of the network computing devices of the server devices 204(1)-204(n) operates to manage and/or otherwise coordinate operations of the other network computing devices.

The server devices 204(1)-204(n) may operate as a plurality of network computing devices within a cluster architecture, a peer-to peer architecture, virtual machines, or within a cloud architecture, for example. Thus, the technology disclosed herein is not to be construed as being limited to a single environment and other configurations and architectures are also envisaged.

The plurality of client devices 208(1)-208(n) may also be the same or similar to the computer system 102 or the computer device 120 as described with respect to FIG. 1, including any features or combination of features described with respect thereto. Client device in this context refers to any computing device that interfaces to communications network(s) 210 to obtain resources from one or more server devices 204(1)-204(n) or other client devices 208(1)-208(n).

According to exemplary embodiments, the client devices 208(1)-208(n) in this example may include any type of computing device that can facilitate the implementation of the SSM 202 that may efficiently combine multiple client side to server connections from the same browser within the computing device into a single connection per browser to improve network communication and reduce power consumption. Accordingly, the client devices 208(1)-208(n) may be mobile computing devices, desktop computing devices, laptop computing devices, tablet computing devices, virtual machines (including cloud-based computers), or the like, that host chat, e-mail, or voice-to-text applications, for example.

The client devices 208(1)-208(n) may run interface applications, such as standard web browsers or standalone client applications, which may provide an interface to communicate with the SSM 202 via the communication network(s) 210 in order to communicate user requests. The client devices 208(1)-208(n) may further include, among other features, a display device, such as a display screen or touchscreen, and/or an input device, such as a keyboard, for example.

Although the exemplary network environment 200 with the SSM 202, the server devices 204(1)-204(n), the client devices 208(1)-208(n), and the communication network(s) 210 are described and illustrated herein, other types and/or numbers of systems, devices, components, and/or elements in other topologies may be used. It is to be understood that the systems of the examples described herein are for exemplary purposes, as many variations of the specific hardware and software used to implement the examples are possible, as will be appreciated by those skilled in the relevant art(s).

One or more of the devices depicted in the network environment 200, such as the SSM 202, the server devices 204(1)-204(n), or the client devices 208(1)-208(n), for example, may be configured to operate as virtual instances on the same physical machine. For example, one or more of the SSM 202, the server devices 204(1)-204(n), or the client devices 208(1)-208(n) may operate on the same physical device rather than as separate devices communicating through communication network(s) 210. Additionally, there may be more or fewer SSMs 202, server devices 204(1)-204(n), or client devices 208(1)-208(n) than illustrated in FIG. 2.

In addition, two or more computing systems or devices may be substituted for any one of the systems or devices in any example. Accordingly, principles and advantages of distributed processing, such as redundancy and replication also may be implemented, as desired, to increase the robustness and performance of the devices and systems of the examples. The examples may also be implemented on computer system(s) that extend across any suitable network using any suitable interface mechanisms and traffic technologies, including by way of example only teletraffic in any suitable form (e.g., voice and modem), wireless traffic networks, cellular traffic networks, Packet Data Networks (PDNs), the Internet, intranets, and combinations thereof.

Figure 3:
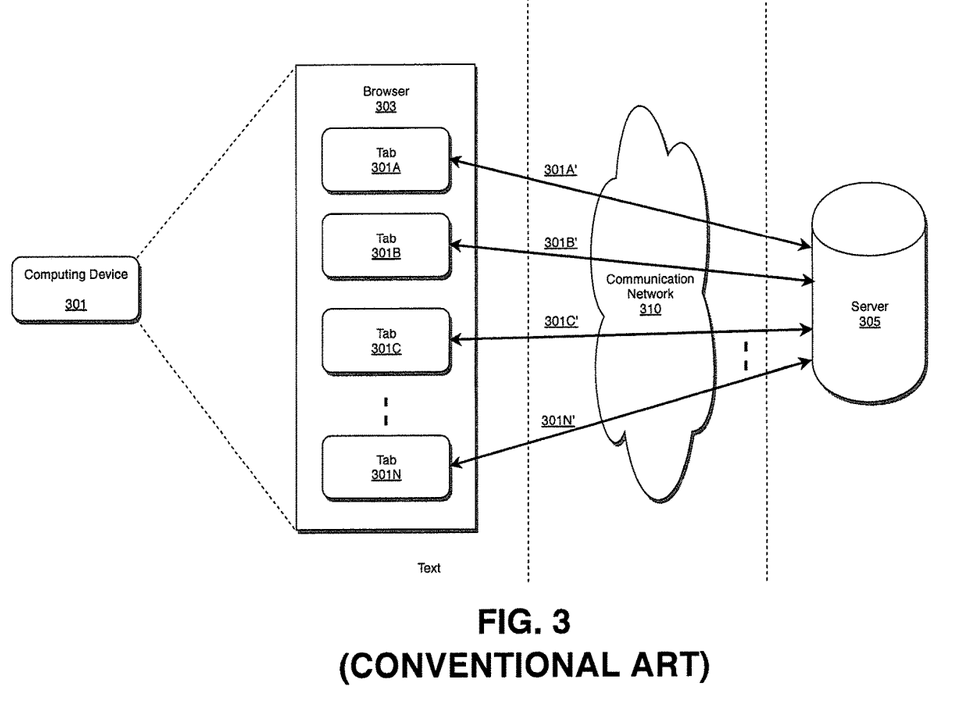
FIG. 3 illustrates a conventional browser implementation diagram without a session sharing shared worker module.

FIG. 3 is a block diagram illustrating a conventional computing device without a session sharing shared worker module. As depicted in FIG. 3, a computing device 301 may be coupled to a server 305 via communication network 310. In order to access information accessible from the server 305, one or more browser applications (browsers) 303 may run on the computing device 301. Browser 303 may be configured to run within a local operating system of the computing device 301.

Non-limiting examples of known browser applications include Microsoft Explorer™, Apple Safari™, Mozilla Firefox™ and Google Chrome™ browser. Non-limiting examples of known operating systems for desktop and/or laptop computers may include Microsoft Vista™, Apple Snow Leopard™, or Linux. Examples of known operating systems for mobile devices (e.g., smartphones, netbooks, etc.) include Microsoft Windows Mobile®, Apple Iphone OS®, and Google Android™ mobile technology platform.

Browser 303 may be configured to enable a user to manipulate access to information accessible via communication network 310. For example, browser 303 may provide a user with an ability to enter one or more uniform resource indicators (URIs, e.g., www.google.com) in order to access a web application, such as, for example, a hypertext markup language (HTML) document. A web application, and/or information used by a web application, may be stored on the server 305. Browser 303 may be configured to access web applications and/or other information stored on the server for presentation to a user of computing device 301, among other uses.

As illustrated in FIG. 3, a plurality of web applications may be operating within browser 303. For example, a first web application may be associated with a first tab 301A, a second web application may be associated with a second tab 301B, a third web application may be associated with a third tab 301C, and an n-th web application may be associated with an N-th tab 301N. In some examples, the plurality of web applications may be web documents, e.g., a HTML document as discussed above. In other examples, web applications may be non-document web applications that perform other functionality within a browser 303.

Since the browser 303 of the conventional computing device 301 as illustrated in FIG. 3 may not be configured to implement a session sharing shared worker module of the instant disclosure, each of tabs 301A-301N are configured to individually communicate with the server 305 via the communication network 310 to access information stored on the server 305. For example, the first tab 301A may communicate with the server 305 via the communication network 310 to access information stored on the server 305 by utilizing a first connection port/point 301A', the second tab 301A may communicate with the server 305 via the communication network 310 to access information stored on the server 305 by utilizing a second connection port/point 301B', the third tab 301C may communicate with the server 305 via the communication network 310 to access information stored on the server 305 by utilizing a third connection port/point 301C', and the N-th tab 301N may communicate with the server 305 via the communication network 310 to access information stored on the server 305 by utilizing an N-th connection port/point 301N'.

Thus, for example, if twenty (20) tabs are open within the browser 303 of the computing device 301, according to a conventional browser implementation as illustrated in FIG. 3, twenty (20) individual connection ports, one for each tab, may be created to connect to the server 305, causing a slower network communication and an increased power consumption, and/or any other issue that may cause poor system performance. Poor system performance may include, for example, delayed server responses, slow webpage load times, network congestion, system latency, slow client device response times, etc.

Figure 4:
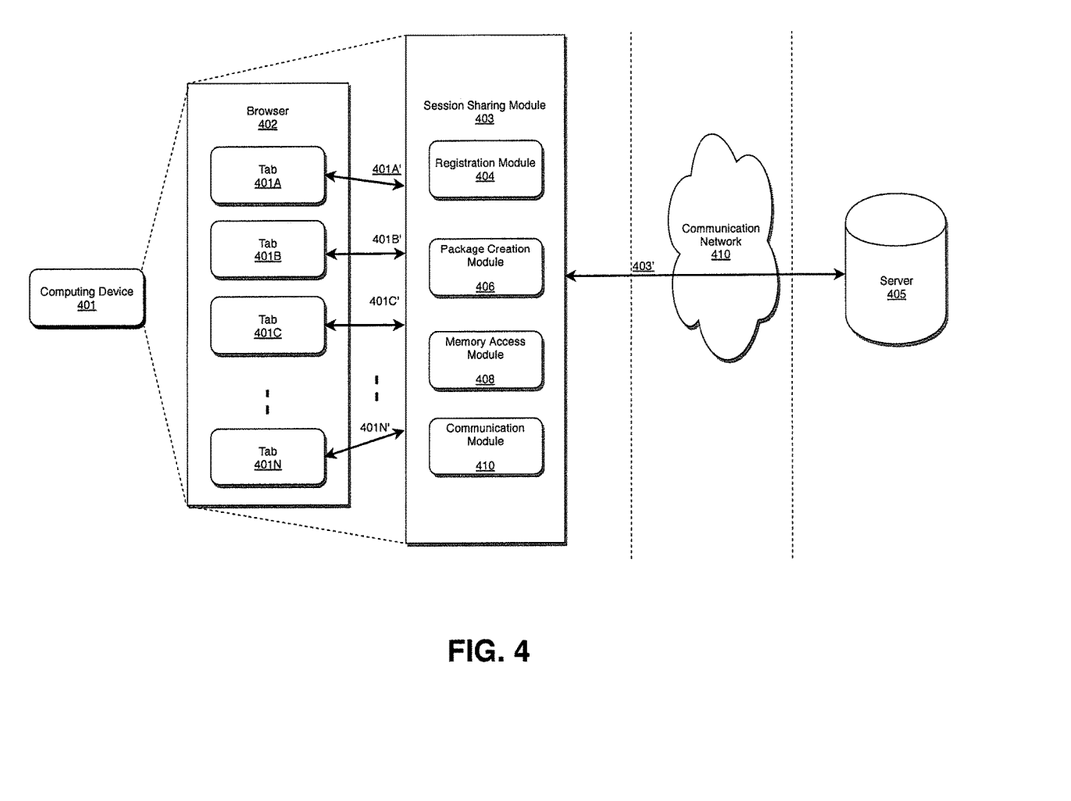
FIG. 4 illustrates a browser implementation diagram with a session sharing shared worker module in accordance with an exemplary embodiment.

FIG. 4 is a block diagram illustrating a computing device with a session sharing shared worker module in accordance with exemplary embodiments of the instant disclosure. As depicted in FIG. 4, a computing device 401 may be coupled to a server 405 via a communication network 410. In order to access information accessible from the server 405, one or more browser applications (browsers) 402 may run on the computing device 401. Browser 402 may be configured to run within a local operating system of the computing device 401. The communication network 410 may be the communication network 210 as disclosed herein with reference to FIG. 2. Unlike the conventional browser implementation method described above with respect to FIG. 3, the computing device 401 of the instant disclosure may be configured to implement a session sharing module (SSM) 403 that may efficiently combine multiple client side to server connections from the same browser 402 within the computing device 401 into a single connection per browser to improve network communication and reduce power consumption. The computing device 401 may be the same or similar to any one of the client devices 208(1)-208(n) as described with respect to FIG. 2, including any features or combination of features described with respect thereto. The SSM 403 may be the same or similar to the SSM 202 as described with respect to FIG. 2, including any features or combination of features described with respect thereto.

According to exemplary embodiments, SSM 403 may include a registration module 404, a package creation module 406, a memory access module 408, and a communication module 410. As illustrated in FIG. 4, a plurality of web applications may be operating within browser 402. For example, a first web application may be associated with a first tab 401A, a second web application may be associated with a second tab 401B, a third web application may be associated with a third tab 401C, and an n-th web application may be associated with an N-th tab 401N. In some examples, the plurality of web applications may be web documents, e.g., a HTML document as discussed above. In other examples, web applications may be non-document web applications that perform some sort of functionality within a browser 402.

According to exemplary embodiments, each of registration module 404, package creation module 406, memory access module 408, and a communication module 410 of the SSM 403 may be implemented by microprocessors or similar, and may be programmed using software (e.g., microcode) to perform various functions discussed herein and may optionally be driven by firmware and/or software. Alternatively, each of registration module 404, package creation module 406, memory access module 408, and communication module 410 of the SSM 403 may be implemented by dedicated hardware, or as a combination of dedicated hardware to perform some functions and a processor (e.g., one or more programmed microprocessors and associated circuitry) to perform other functions.

Since the browser 402 of the instant computing device 401 as illustrated in FIG. 4 may be configured to implement SSM 403 of the instant disclosure, each of tabs 401A-401N are configured to communicate with the server 405 via the communication network 410 to access information stored on the server 405 by utilizing the SSM 403 as a messaging bus, thereby not requiring to create any individual connection port/point for each of tabs 401A-401N to connect to the server 405.

For example, the computing device 401 may execute a plurality of web applications associated with a plurality of tabs 401A-401N within the browser 402. According to exemplary embodiments, each tab may have different web content than the other tabs, but the disclosure is not limited thereto. The computing device 401 may determine whether a shared worker is available within the browser 402. A shared worker is an area of the browser 402 that is at a higher level than the plurality of tabs 401A-401N and is configured to run computer executable programming (e.g., JavaScript) in the same manner as the plurality of tabs 401A-401N, but without any visuals. The shared worker may be accessible from all tabs 401A-401N within the browser 402 and may be configured to allow one tab to communicate with other tabs via the higher level by utilizing the SSM 403.

If the computing device 401 determines that a shared worker is available or if a new shared worker is being instantiated within the browser 402, the registration module 404 of the SSM 403 registers each of tabs 401A-401N with the shared worker. The registration module 404 will assign a unique identification for each of tabs 401A-401N during registration. For example, during registration, the first tab 401A may be assigned a first reference identification, the second tab 401B may be assigned a second reference identification, the third tab 401C may be assigned a third reference identification, and the N-th tab 401N may be assigned an N-th reference identification. Each of reference identifications may be unique in that the communication module 410 may communicate with each of tabs 401A-401N by utilizing corresponding reference identification.

According to exemplary embodiments, a shared worker may implement an interface that may represent a specific kind of worker that may be accessed from several browsing contexts, such as several windows/tabs 401A-401N, iframes or even workers. According to exemplary embodiments, the shared worker may implement an interface different than dedicated workers and may include a different global scope. According to exemplary embodiments, the creation of the shared worker may be tied to the same origin. For example, www.mysite.com may not access the shared worker from www.yoursite.com. Thus, shared workers may be accessed by a plurality of tabs or a plurality of browser windows within the same browser (e.g., Mozilla Firefox™ or Google Chrome™ browser). That is, tabs or windows running within Mozilla Firefox™ browser may not access shared workers running within Google Chrome™ browser.

Each of reference identifications associated with corresponding tab may be stored in the memory access module 408. The memory access module 408 may be the same or similar to the memory 106 as described with reference to FIG. 1.

As illustrated in FIG. 4, the SSM 403 includes a communication module 410. The communication module 410 may be configured to communicate with one or more tabs 401A-401N operating on the browser 402 in which SSM 403 is operating. The communication module 410 may be configured to, for example, receive requests from one or more tabs 401A-401N to fetch information from the server 405. The communication module 410 may be configured to communicate with the server 405 via the communication network 410 to fetch information requested by the one or more tabs 401A-401N. How the communication module 410 communicates with the tabs 401A-401N and the server 405 will be described below.

According to exemplary embodiments, the first tab 401A may send a first request to the SSM 403 to connect to the server 405, the second tab 401B may send a second request to the SSM 403 to connect to the server 405, the third tab 401C may send a third request to the SSM 403 to connect to the server 405, and the N-th tab 401N may send an N-th request to the SSM 403 to connect to the server 405. The communication module 410 may receive the request from each of tabs 401A-401N via a corresponding event bridge. For example, the communication module 410 may be configured to receive the first request from the first tab 401A, the second request from the second tab 401B, the third request from the third tab 401C, and the N-th request from the N-th tab 401N via a first event bridge 401A', a second event bridge 401B', a third event bridge 401C', and an N-th event bridge 401N', respectively. The respective event bridge and the unique identification associated with each of tabs 401A-401N may be utilized by the communication module 410 to establish communication between the tabs 401A-401N and the SSM 403. For example, in response to the request sent from one or more tabs 401A-401N, the communication module 410 may be configured to route the message to the correct tab by utilizing the respective event bridge and the unique identification associated with each of tabs 401A-401N.

In one example, after receiving the requests from each of tabs 401A-401N, the package creation module 406 may be configured to combine all received requests into one packaged request to be delivered to the server 405. The communication module 410 may be configured to send the packaged request to the server 405 via the communication network 410 by utilizing a single connection point/port 403'. This single connection point/port 403' may be utilized to establish communication between the SSM 403 and the server 405. Thus, unlike the conventional browser implementation described above with reference to FIG. 3, the browser implementation according to the instant disclosure does not need to create individual connection port for each tab to be connected to the server 405.

According to exemplary embodiments, in response to the packaged request sent to the server 405, the communication module 410 may be configured to receive a response (i.e., server connection is completed) corresponding to each request from the server 405 via the communication network 410 by utilizing the single connection point/port 403'. After receiving the response from the server 405, the communication module 410 may be configured to send the response to the correct tab 401A-401N by utilizing the corresponding event bridge 401A'-401N' and the unique reference identification associated with each of tabs 401A-401N. For example, a first response from the server 405 associated with a first request from the first tab 401A may be sent by the communication module 410 to the first tab 401A by utilizing the first event bridge 401A' and the first reference identification, a second response from the server 405 associated with a second request from the first tab 401B may be sent by the communication module 410 to the second tab 401B by utilizing the second event bridge 401B' and the second reference identification, and so on.

According to exemplary embodiments, when a plurality of tabs 401A-401N are opened by the computing device 401 at the same time or before a connection is established between the communication module 410 and the server 405, the connection port/point 403' may be remained open and all of the plurality of tabs 401A-401N may receive the message (e.g., server connection is completed). According to exemplary embodiments, when a plurality of tabs 401A-401N are opened by the computing device 401 and a connection is established between the communication module 410 and the server 405 via the connection port/point 403', and then one of the plurality of tabs 401A-401N is closed by the computing device 401 before receiving the message from the server 405, the connection port/point 403' will remain open, but the event bridge corresponding to the closed tab between the communication module 410 and the browser 402 will be closed. However, according to exemplary embodiments, when a plurality of tabs 401A-401N are opened by the computing device 401 and a connection is established between the communication module 410 and the server 405 via the connection port/point 403', but all of the plurality of tabs 401A-401N are closed by the computing device 401 before receiving a message from the server 405, the connection port/point 403' will be closed, thereby closing the communication/connection between the communication module 410 and the server 405.

Although FIG. 4 illustrates a single connection port/point 403' between the SSM 403 and the server 405, the disclosure is not limited thereto. For example, according to exemplary embodiments, based on the number of requests received from a plurality of tabs 401A-401N, the package creation module 406 may be configured to create multiple packaged requests each containing at least two requests from at least two of tabs 401A-401N. The communication module 410 may be configured to send each packaged request to the server 405 via the communication network 410 by utilizing a corresponding connection point/port. For example, if twenty (20) requests to connect to the server 405 are being sent by twenty different (20) tabs, the package creation module 406 may be configured to combine five (5) requests into one packaged request, thereby creating four (4) packaged requests each containing five (5) requests from five (5) different tabs. Thus, according to this exemplary embodiment, when twenty (20) requests are being sent by twenty different (20) tabs to connect to the server 405, the communication module 410 may be configured to send the four (4) packaged requests to the server 405 via the communication network 410 by utilizing four (4) connection points/ports, each connection point/port containing one packaged request, and each packaged request containing five (5) requests from five (5) tabs. Thus, by utilizing the SSM 403 of the instant disclosure, compared to the conventional browser implementation technique, the browser implementation technique according to the example embodiments may significantly reduce the number of connection points/ports necessary to maintain a connection between a plurality of tabs 401A-401N and a server 405, thereby improving system performance and reducing power consumption.

Figure 5:
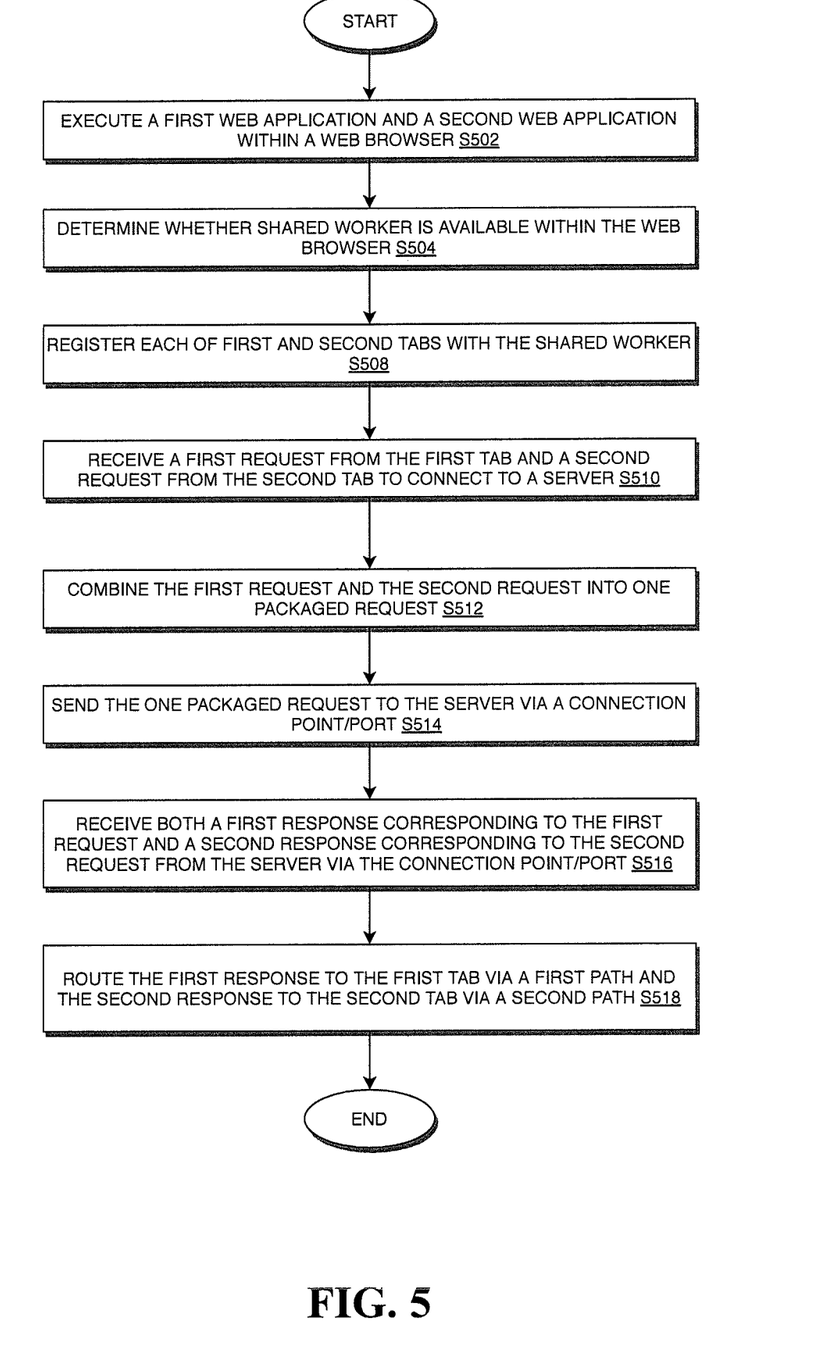
FIG. 5 is a flowchart of an exemplary process for implementing a session sharing shared worker module in accordance with an exemplary embodiment.

FIG. 5 illustrates a flowchart of an exemplary process for implementing a session sharing shared worker module in accordance with an exemplary embodiment.

In the process 500 of FIG. 5, a computing device executes a first web application and a second web application within a web browser at step S502. The computing device may be the computing device 401 of FIG. 4 or any one of the client devices 208(1)-208(n) of FIG. 2 and the web browser may be the browser 402 of FIG. 4 as disclosed above in accordance with exemplary embodiments, but the disclosure is not limited thereto. The first web application may be associated with any one of the plurality of tabs 401A-401N and the second web application may be associated with the other one of the plurality of tabs 401A-401N of FIG. 4.

At step S504, the computing device 401 may determine whether a shared worker is available within the browser 402. According to exemplary embodiments, a shared worker may include a session sharing shared worker module of the instant disclosure. The session sharing shared worker module may be the SSM 202 of FIG. 2 or SSM 403 of FIG. 4. The SSM 202/SSM 403 may include a registration module 404, a package creation module 406, a memory access module 408 and a communication module 410.

At step S504, if the computing device 401 determines that a shared worker is available within the browser 402, at step S508 the registration module 404 of the SSM 403 registers each of tabs 401A-401N with the shared worker. The registration module 404 will assign a unique identification for each of tabs 401A-401N during registration. For example, during registration, at step S508, the first tab 401A may be assigned a first reference identification, the second tab 401B may be assigned a second reference identification, the third tab 401C may be assigned a third reference identification, and the N-th tab 401N may be assigned an N-th reference identification. Each of reference identifications may be unique in that the communication module 410 may communicate with each of tabs 401A-401N by utilizing corresponding reference identification. Each of reference identifications associated with corresponding tab may be stored in the memory access module 408 of SSM 403. The communication module 410 may be configured to communicate with one or more tabs 401A-401N operating on the browser 402 in which SSM 403 is operating.

At step S510, the communication module 410 of SSM 403 may receive a first request from the first tab (e.g., tab 401A) to connect to the server 405 and a second request from the second tab (e.g., tab 401B) to connect to the server 405. For example, the communication module 410 may be configured to receive the first request from the first tab 401A and the second request from the second tab 401B via a first event bridge 401A' and a second event bridge 401B', respectively. The respective event bridge and the unique identification associated with each of tabs 401A and 401B may be utilized by the communication module 410 to establish communication between the tabs 401A and 401B and the SSM 403.

At step S512, the package creation module 406 of SSM 403 combines the first request and the second request into one (i.e., a single) packaged request.

At step S514, the communication module 410 sends the one, (i.e., the single) packaged request to the server 405 via a connection point/port 403'. According to exemplary embodiments, the connection point/port 403' may be a single connection point/port to establish connection between the communication module 410 of SSM 403 and the server 405 via the communication network 210, the single connection point/port carrying a single packaged request having a predetermined number of combined requests/messages (e.g., two, three, four, five, six, etc.). According to exemplary embodiments, the communication module may establish a plurality of connection points/ports, each connection point/port carrying a single packaged request having a predetermined number of combined requests/messages (e.g., two, three, four, five, six, etc.).

At step S516, the communication module 410 may receive both a first response corresponding to the first request and a second response corresponding to the second request from the server 405 via the connection point/port 403'.

At step S518, the communication module 410 routes the first response to the first tab (e.g., tab 401A) via first path (e.g., event bridge 401A') and the second response to the second tab (e.g., tab 401B) via a second path (e.g., event bridge 401B').

According to exemplary embodiments, based on the number of requests received from a plurality of tabs 401A-401N, the package creation module 406 may be configured to create multiple packaged requests each containing at least two requests from at least two of tabs 401A-401N. The communication module 410 may be configured to send each packaged request to the server 405 via the communication network 210 by utilizing a corresponding connection point/port. According to conventional browser implementation that does not utilize a session sharing shared worker module of the instant disclosure, individual connection ports, one for each tab, may be created to connect to the server 305, causing a slower network communication and an increased power consumption, and/or any other issue that may cause poor system performance. According to exemplary embodiments, by utilizing the SSM 403 of the instant disclosure, compared to the conventional browser implementation technique, the browser implementation technique may significantly reduce the number of connection points/ports necessary to maintain a connection between a plurality of tabs 401A-401N and a server 405, thereby improving system performance and reducing power consumption.

According to exemplary embodiments, the code which may run inside the Shared Worker (SW) may be standard JavaScript and as such may be run in or outside of the shared worker space (i.e., processing area). However, when the code runs outside of the shared worker space then it may lose its ability to use the inventive features of the instant disclosure outlined above. When the code runs outside of the shared worker space, a fake or simulated shared worker may be created by a system call such as new SessionSharingWorker('worker.js') (SessionSharingWorker (SSW) is a code that the browser provides if a shared worker is available; worker.js may be a code that may contain all the code of the inventive features of the instant disclosure outlined above; worker.js may be the code that may run inside the 'higher' level outside of the tab process).

According to exemplary embodiments, inside the SSW, a computing device may determine if an actual SW was available, if so then it would create or join an existing one. If the computing device determines that an actual SW is not available, then the computing device may create a fake or simulated SW wrapper to replicate what would normally be set up in the SW but this would be inside the actual tab.

Thus, according to the exemplary embodiments, if the computing device determines that an actual SW is not available within the browser, the creation of a fake or simulated SW outlined above may allow any calls from the client/consumer code that would go over the messaging bridge of the instant disclosure to the SW to be diverted to the fake or simulated SW. Thus, as far as the clients/consumers are concerned, there may not be any difference as to how they wrote their program. The difference may be that the benefits of inventive features outlined in the instant disclosure may not be utilized by that particular browser in which an actual SW is not available.

Although the invention has been described with reference to several exemplary embodiments, it is understood that the words that have been used are words of description and illustration, rather than words of limitation. Changes may be made within the purview of the appended claims, as presently stated and as amended, without departing from the scope and spirit of the present disclosure in its aspects. Although the invention has been described with reference to particular means, materials and embodiments, the invention is not intended to be limited to the particulars disclosed; rather the invention extends to all functionally equivalent structures, methods, and uses such as are within the scope of the appended claims.

For example, while the computer-readable medium may be described as a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the embodiments disclosed herein.

The computer-readable medium may comprise a non-transitory computer-readable medium or media and/or comprise a transitory computer-readable medium or media. In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. Accordingly, the disclosure is considered to include any computer-readable medium or other equivalents and successor media, in which data or instructions may be stored.

Although the present application describes specific embodiments which may be implemented as computer programs or code segments in computer-readable media, it is to be understood that dedicated hardware implementations, such as application specific integrated circuits, programmable logic arrays and other hardware devices, can be constructed to implement one or more of the embodiments described herein. Applications that may include the various embodiments set forth herein may broadly include a variety of electronic and computer systems. Accordingly, the present application may encompass software, firmware, and hardware implementations, or combinations thereof. Nothing in the present application should be interpreted as being implemented or implementable solely with software and not hardware.

Although the present specification describes components and functions that may be implemented in particular embodiments with reference to particular standards and protocols, the disclosure is not limited to such standards and protocols. Such standards are periodically superseded by faster or more efficient equivalents having essentially the same functions. Accordingly, replacement standards and protocols having the same or similar functions are considered equivalents thereof.

The illustrations of the embodiments described herein are intended to provide a general understanding of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A method for implementing a session sharing shared worker module, the method comprising:

executing, by a processor, a first web application and a second web application within a web browser, the first web application being associated with a first tab, and the second web application being associated with a second tab having different web content than the first tab;

determining, by the processor, whether a shared worker is available within the web browser, if no shared worker is available, initiating a new shared worker within the web browser;

registering, by the processor, each of said first tab and the second tab with the shared worker based on determining that the shared worker is available within the web browser;

receiving, by the processor, a first request from the first tab to connect to a server and a second request from the second tab to connect to the server;

combining, by the processor, the first request and the second request into one packaged request;

creating, by the processor, a single connection point within the shared worker for a plurality of tabs including the first tab and the second tab and combining the plurality of tabs to server connections from the same browser into a single connection per browser;

sending, by the processor, the one packaged request to the server via the single connection point, storing, in response to the registering, within the shared worker a first reference identification associated with the first tab and a second reference identification associated with the second tab;

receiving, by the processor, a first response corresponding to the first request and a second response corresponding to the second request from the server as a packaged response via the single connection point; and routing the first response to the first tab via a first path based on the first reference identification and the second response to the second tab via a second path different from the first path based on the second reference identification, wherein the shared worker is an area of the web browser that is operating at a higher level than the first and second tabs and is configured to run programming in the same manner as the first and second tabs but without any visuals, and wherein the shared worker is accessible from all tabs within the browser and is configured to allow one tab to communicate to other tabs via the higher level.

2. The method according to claim 1, further comprising:
when a plurality of tabs are opened by the processor at the same time or before a connection is established between the processor and the server, maintaining the single connection point open so that the processor receives a message corresponding to each of said plurality of tabs via the single connection point.

3. The method according to claim 1, wherein when a plurality of tabs are opened by the processor at the same time and a connection is established between the processor and the server via the single connection point, and then one of the plurality of tabs is closed by the processor before receiving a message from the server, the method further comprising:
　　maintaining the single connection point open so that the processor receives a message corresponding to each of said plurality of tabs via the single connection; and
　　closing a connection between the processor and the closed tab.

4. A system for implementing a session sharing shared worker module, comprising:
　　a processor; and
　　a server, wherein:
　　the processor is configured to:
　　execute a first web application and a second web application within a web browser, the first web application being associated with a first tab, the second web application being associated with a second tab having different web content than the first tab and determine whether a shared worker is available within the web browser, if no shared worker is available, initiate a new shared worker within the web browser;
　　register each of said first tab and the second tab with the shared worker based on determining that the shared worker is available within the web browser;
　　receive a first request from the first tab to connect to the server and a second request from the second tab to connect to the server;
　　combine the first request and the second request into one packaged request;
　　create, a single connection point within the shared worker for a plurality of tabs including the first tab and the second tab and combine the plurality of tabs to server connections from the same browser into a single connection per browser;
　　send the one packaged request to the server via the single connection point;
　　store, in response to the registering, within the shared worker a first reference identification associated with the first tab and a second reference identification associated with the second tab; receive a first response corresponding to the first request and a second response corresponding to the second request from the server as a packaged response via the single connection point; and route the first response to the first tab via a first path based on the first reference identification and the second response to the second tab via a second path different from the first path based on the second reference identification,
　　wherein the shared worker is an area of the web browser that is operating at a higher level than the first and second tabs and is configured to run programming in the same manner as the first and second tabs but without any visuals, and
　　wherein the shared worker is accessible from all tabs within the browser and is configured to allow one tab to communicate to other tabs via the higher level.

5. The system according to claim 4, wherein when a plurality of tabs are opened by the processor at the same time or before a connection is established between the processor and the server, the processor is configured to maintain the single connection point open so that the processor can receive a message corresponding to each of said plurality of tabs via the single connection point.

6. The system according to claim 4, wherein when a plurality of tabs are opened by the processor at the same time and a connection is established between the processor and the server via the single connection point, and then one of the plurality of tabs is closed by the processor before receiving a message from the server, the processor is further configured to:
　　maintain the single connection point open so that the processor can receive a message corresponding to each of said plurality of tabs via the single connection; and
　　close a connection between the processor and the closed tab.

7. A non-transitory computer readable medium configured to store instructions for implementing a session sharing shared worker, wherein when executed, the instructions cause a processor to perform the following:
　　executing a first web application and a second web application within a web browser, the first web application being associated with a first tab, the second web application being associated with a second tab having different web content than the first tab;
　　determining whether a shared worker is available within the web browser, if no shared worker is available, initiating a new shared worker within the web browser;
　　registering each of said first tab and the second tab with the shared worker based on determining that the shared worker is available within the web browser;
　　receiving a first request from the first tab to connect to a server and a second request from the second tab to connect to the server;
　　combining the first request and the second request into one packaged request;
　　creating a single connection point within the shared worker for a plurality of tabs including the first tab and the second tab and combining the plurality of tabs to server connections from the same browser into a single connection per browser;
　　sending the one packaged request to the server via the single connection point;
　　storing, in response to the registering, within the shared worker a first reference identification associated with the first tab and a second reference identification associated with the second tab;
　　receiving a first response corresponding to the first request and a second response corresponding to the second request from the server as a packaged response via the single connection point; and
　　routing the first response to the first tab via a first path based on the first reference identification and the second response to the second tab via a second path different from the first path based on the second reference identification,
　　wherein the shared worker is an area of the web browser that is operating at a higher level than the first and second tabs and is configured to run programming in the same manner as the first and second tabs but without any visuals, and
　　wherein the shared worker is accessible from all tabs within the browser and is configured to allow one tab to communicate to other tabs via the higher level.

8. The non-transitory computer readable medium of claim 7, wherein when a plurality of tabs are opened by the processor at the same time or before a connection is established between the processor and the server, the instructions further cause the processor to maintain the single connection point open so that the processor receives a message corresponding to each of said plurality of tabs via the single connection point.

9. The non-transitory computer readable medium of claim 7, wherein when a plurality of tabs are opened by the processor at the same time and a connection is established between the processor and the server via the single connection point, and then one of the plurality of tabs is closed by the processor before receiving a message from the server, the instructions further cause the processor to perform the following:
- maintaining the single connection point open so that the processor receives a message corresponding to each of said plurality of tabs via the single connection; and
- closing a connection between the processor and the closed tab.

\* \* \* \* \*